_United States Patent Office_

3,388,075
Patented June 11, 1968

3,388,075
INDICATOR FOR NITROGEN OXIDE
Lothar W. Brauer, 12 Strassburger Strasse,
1 Berlin 20, Germany
No Drawing. Filed Nov. 5, 1965, Ser. No. 506,584
Claims priority, application Germany, Nov. 10, 1964,
A 47,559
4 Claims. (Cl. 252—408)

ABSTRACT OF THE DISCLOSURE

An indicator of an inert granular solid carrying diphenylbenzidine-decasulfonic acid or an alkali metal salt thereof is responsive to oxidizing nitrogen oxides and acids by changing color from white to grey-blue.

---

This invention relates to the detection and the quantitative determination of nitrogen oxides or nitric acid in other gases and a colorimetric indcator therefor.

In well known and widely accepted methods of determining various gases, a sample of gas is passed through an elongate bed of colorimetric indicator contained in a transparent tube. Presence of the gas to be detected changes the color of the indicator lengthwise of the bed and, when precalibrated, the length of the color stain developed is a quantitative measure of the detected gas. The tubes generally are sealed for storage and the ends are opened when they are to be used for gas detection and analysis.

In determining nitrogen oxides, indicators containing tetraphenylbenzidine or dimethyldiphenylbenzidine on a granular carrier have been used by Stanford and Plantz, U.S. Patent 2,963,351. Such indicators are very sensitive to nitrogen dioxide, but they have the disadvantage that they deteriorate on exposure to oxygen, so that they must be handled carefully in bulk and oxygen must be removed from tubes containing them to provide suitable storage life. Also, in preparation of such indicators, the benzidine component and granular carrier are heated to sublime the benzidine component into the carrier; unless carefully performed, this can lead to an uneven distribution of reagent on the support material.

It is an object of this invention to provide a granular colorimetric indicator for nitrogen oxides or nitric acid that is stable in air. Other objects will be apparent from the following description and claims.

In the indicator of this invention, a diphenylbenzidine-decasulfonic acid or a water soluble salt of diphenylbenzidine-decasulfonic acid is carried by a granular solid. The granular solid carrier, preferably a granular absorbent, does not enter into the color producing reaction, but serves merely as an inert physical carrier for the reagent. Among the various carriers available, silica gel is preferred. Any water soluble salt of diphenylbenzidine-decasulfonic acid may be used; alkali metal salts, such as sodium salts, are preferred.

In accordance with the preferred embodiment of this invention, the carrier is impregnated with an aqueous solution of diphenylbenzidine-decasulfonic acid or a water soluble salt thereof and dried until the indicator appears dry and is free flowing. The solution impregnation assures an even distribution of the reagent in the carrier. Furthermore, the reagent does not sublime so there is no undesirable transport of the reagent during storage at elevated temperatures.

Exemplifying this invention, a solution of 10 mg. of N,N'-diphenylbendizine-decasulfonic acid - deca - sodium salt in 50 ml. of water is thoroughly mixed with 100 g. of silica gel, suitably having a granule size of 0.3–0.5 mm. The mixture is vacuum dried, suitably at 70° C., until the indicator is free-flowing.

The indicator is responsive to oxidizing nitrogen oxides and acids, such as $NO_2$ and higher oxides and nitric acid mists, changing color from white to grey-blue. Nitrogen monoxide, NO, may be determined by first oxidizing it to $NO_2$, to which the indicator is responsive.

Indicator tubes are prepared by disposing an elongate bed of the indicator in a transparent tube held in place with porous plugs of, for example, glass wool, and the ends of the tube are sealed. The indicator is stable in air, so no special handling is required nor is it necessary to remove air or oxygen from the tube before it is sealed. When gas containing a nitrogen oxide or acid to which the indicator is responsive is passed through the tube, a grey-blue stain develops along the length of the bed. Concentrations of nitrogen oxides and acids as low as about 0.25 p.p.m. to 0.5 p.p.m. may be detected.

According to the provisions of the patent statutes, I have explained the principle and mode of practice of my invention and have described what I now consider to represent its best embodiment. However, I desire to have it understood that, within the scope of the appended claims, the invention may be practiced otherwise than as specifically described.

I claim:
1. A dry free-flowing colorimetric indicator for nitrogen oxides and nitric acid consisting essentially of an inert granular solid carrying a reagent selected from the group consisting of diphenylbenzidine-decasulfonic acid and alkali meteal salts thereof.
2. An indicator according to claim 1 in which the reagent is the decasodium salt of N,N'-diphenylbenzidine decasulfonic acid.
3. An indicator according to claim 2 in which the granular solid is silica gel.
4. An indicator according to claim 1 in which the granular solid is silica gel.

References Cited
UNITED STATES PATENTS
2,963,351  12/1960  Stanford et al. ____ 252—408 X FOREIGN PATENTS
1,146,676  4/1962  German.

LEON D. ROSDOL, _Primary Examiner._
M. WEINBLATT, _Assistant Examiner._